J. C. & I. L. DECKARD.
SPRING WHEEL.
APPLICATION FILED MAY 23, 1911.

1,021,355.

Patented Mar. 26, 1912.

Witnesses

Inventors
J. C. Deckard
I. L. Deckard

By Attorneys

UNITED STATES PATENT OFFICE.

JOHN C. DECKARD AND ISAAC L. DECKARD, OF VINCENNES, INDIANA.

SPRING-WHEEL.

1,021,355. Specification of Letters Patent. Patented Mar. 26, 1912.

Application filed May 23, 1911. Serial No. 628,930.

*To all whom it may concern:*

Be it known that we, JOHN C. DECKARD and ISAAC L. DECKARD, citizens of the United States, residing at Vincennes, in the county of Knox and State of Indiana, have invented certain new and useful Improvements in Spring-Wheels, of which the following is a specification.

This invention relates to spring wheels adaptable to motor, and other vehicles upon which resilient tires are now used.

An object of this invention is to devise a spring wheel having its several parts so arranged and constructed as to take the place of pneumatic tires to avoid the care and expense in the upkeep of the same, and at the same time to have the ease of running and comparative lightness in the weight of the wheel.

Another object of this invention is to provide a spring wheel which conforms to a large extent to the general shape and size of the ordinary wheel, and wherein the resilient or spring portion of the wheel is disposed at the tread of the same to take the place of the common pneumatic tire.

A further object of this invention is to provide a spring wheel with concentric rims joined in a peculiar manner by springs provided with inclined seats so as to support the springs in various angles and to thereby receive the weight upon the wheel longitudinally of the spring. The springs are so arranged that they distribute the weight directly to the lowermost spoke irrespective of the direction in which the wheel turns, and in such a manner that obstructions in the roadway engaging the tread of the wheel strike the springs at their ends and longitudinally depress the same rather than bend the same laterally.

Figure 1:
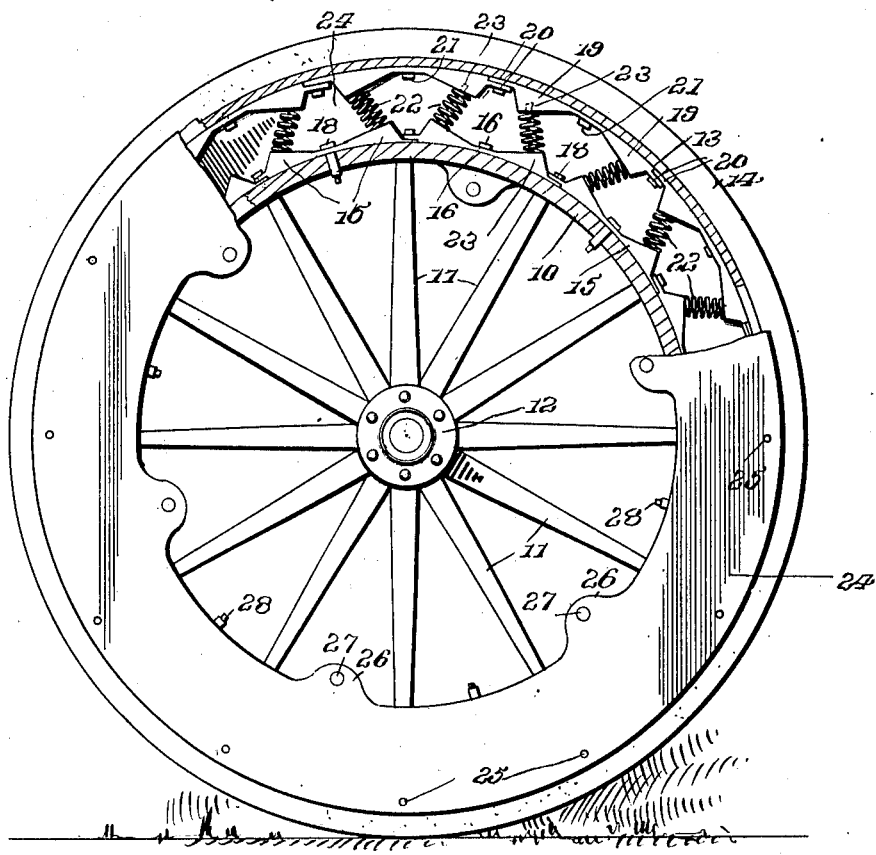
Figure 2:
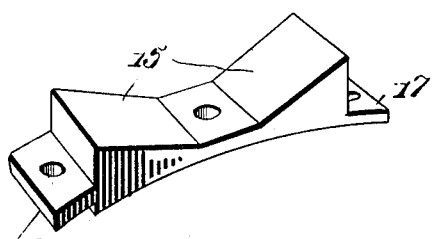

For a full understanding of the invention reference is to be had to the following description and accompanying drawings, in which:

Figure 1 is a side elevation of the improved wheel, part of the same being disclosed in section; and, Fig. 2 is a detail perspective view of one of the spring seat blocks.

Corresponding and like parts are referred to in the following description and indicated in all the views of the drawing by the same reference characters.

Referring to the drawing 10 designates an inner rim supported upon spokes 11 radiating from a suitable hub 12. Concentric about the inner rim 10, and spaced from the same, is an outer rim 13. The rim 13 may be of any adaptable form, and may be provided with a suitable tire 14.

The inner rim 10 is provided with a number of spring seats 15, one of which is positioned between each pair of spokes and against the outer side of the rim 10. Each of the spring seats 15 is formed of a block enlarged at its opposite ends and having its outer face recessed or inclined centrally from the ends of the block to provide inwardly and oppositely inclined outer faces. Retaining screws 16 pass through the intermediate or reduced portion of the block and into the rim 10 to support the block thereon. The spring seats 15 are thus constructed in pairs, and are provided at their outer ends with projecting ears 17 overlapping with the corresponding ears of the adjacent spring seats and lie against the outer face of the rim 10. Retaining screws 18 pass through the overlapping ears and into the rim 10. It will be noted from Fig. 1 that the ears 17 overlap against the rim 10 at points directly opposite to the outer extremities of the spokes 11.

Outer spring seats 19, similar in construction to the spring seats 15 with the exception that the spring seats 19 are elongated and are provided at their ends with relatively long overlapping ears 20 spacing each pair of the spring seats 19 a greater distance apart. It will be noted that the spring seats 19 correspond in number to the spring seats 15 and that they are arranged in staggered relation to the same. Retaining screws 21 pass through the spring seats 19 and the ears 20 and into the outer rim 13 to secure the spring seats against the inner side thereof.

The overlapping ends of the spring seats 15 and 19 have their outer inclined faces arranged oppositely and in parallelism, and springs 22 are interposed between the overlapping spring seats and have their ends resting flat against the opposed faces of the seats. The springs 22 are secured at their ends to the seats 15 and 19 by staples 23, or other suitable fastening means, so as to hold the springs in position whether compressed or expanded.

The spring or resilient mechanism of the wheel is disposed within a suitable casing, the same comprising a pair of ring plates 24 secured to the outer rim 13 by detachable screws 25 passing through the plates 24 adjacent to their outer edges and into the opposite edges of the rim 13. In this manner the rim 13 is practically inclosed between the plates 24 and the tire 14 alone extends beyond the edges of the plates. The plates 24 extend in and against the edges of the inner rim 10, the plates 24 terminating a short distance therebeyond. The plates 24 are provided with pairs of registering and inwardly extending lugs 26 joined by transverse pins 27 providing stops for holding the rims 10 and 13 from expanding beyond a predetermined distance at any point of the wheel. A number of oil cups 28 are carried upon the inner rim 10 and communicate therethrough with the space between the two rims. The oil cups 28 are adapted to feed a quantity of oil to the springs and to the inner faces of the plates 24 to adapt the same to slide easily against the opposite edges of the inner rim 10.

In operation, as the wheel turns the spokes 11 are successively brought to the lower portion of the wheel, and as each spoke is provided at its extremity with a pair of diverging springs 22, the forward spring of the pair is compressed longitudinally and transmits the pressure exerted against the outer rim 13 to the inner rim 10 at the extremity of the lowermost spoke. It will be noted that when the wheel is traveling and it strikes an obstruction in the road, the impact tends to move the outer rim 13 backwardly from the body of the wheel and that since the springs are arranged at an incline or diagonally to the spokes of the wheel, and since the supporting seats for the springs are inclined, the springs offset such impact by their longitudinal depression. By thus arranging the springs, in diverging pairs, one of each pair of springs will lie in a substantially vertical or horizontal plane to support, either by expansion or compression, the body of the wheel or the longitudinal thrust incident to the impact with objects in the roadway.

As the rims 10 and 13 move toward or from each other, the inner rim 10 slides against the inner faces of the casing plates 24 and holds the outer rim from lateral displacement, particularly since the plates are joined at their inner edges by the transverse pins 27.

It can be readily seen that the resilient attachment to the body of the wheel adds but little weight thereto, as the spring seat blocks and the springs are relatively small in size.

Having thus described the invention, what is claimed is:

A wheel including an inner and an outer rim, a plurality of seats having overlapping ends and connected respectively to the inner face of the outer rim and the outer face of the inner rim, each of said seats being formed with reversely inclined faces with the centers of the outer seats opposite the overlapping ends of the inner seats whereby the inclined faces of the outer seats extend respectively in substantially parallel relations to the inclined faces of the inner seats, fastening means operating through said overlapping ends for securing said seats to the rim members, and springs bearing by their ends against each opposing pair of said parallel faces.

In testimony whereof, we affix our signatures in presence of two witnesses.

JOHN C. DECKARD. [L. S.]
ISAAC L. DECKARD. [L. S.]

Witnesses:
LEVI JACKSON MITCHELL,
W. R. BARNARD.

Copies of this patent may be obtained for five cents each, by addressing the "Commissioner of Patents, Washington, D. C."